(12) United States Patent
Takahashi

(10) Patent No.: US 8,649,654 B2
(45) Date of Patent: Feb. 11, 2014

(54) REPRODUCING APPARATUS

(75) Inventor: Kazuhiro Takahashi, Saitama-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1152 days.

(21) Appl. No.: 12/561,088

(22) Filed: Sep. 16, 2009

(65) Prior Publication Data

US 2010/0008652 A1 Jan. 14, 2010

Related U.S. Application Data

(63) Continuation of application No. 11/186,027, filed on Jul. 21, 2005, now Pat. No. 7,616,861.

(30) Foreign Application Priority Data

Jul. 29, 2004 (JP) .................................. 2004-221829

(51) Int. Cl.
*H04N 5/77* (2006.01)

(52) U.S. Cl.
USPC ............ 386/224; 386/230; 386/288; 386/323

(58) Field of Classification Search
USPC .................................. 386/224, 230, 288, 323
See application file for complete search history.

(56) References Cited

U.S. PATENT DOCUMENTS 5,819,103 A * 10/1998 Endoh et al. ...................... 710/1
2003/0204535 A1* 10/2003 Harada ........................ 707/200

* cited by examiner

*Primary Examiner* — Thai Tran
*Assistant Examiner* — Jose Mesa
(74) *Attorney, Agent, or Firm* — Canon USA Inc. IP Division

(57) ABSTRACT

A reproducing apparatus includes a reproduction unit configured to reproduce content data from a recording medium, a management unit configured to classify a plurality of content data recorded on the recording medium into a plurality of groups, and a control unit configured to, responsive to stopping reproducing content data, output to a display device inquiry information for classifying the content data into one of the groups.

12 Claims, 14 Drawing Sheets

FIG.4

| ATTRIBUTE |
|---|
| INDEX NUMBER |
| EXTENDED INDEX OF AUXILIARY INFORMATION |
| INDEX OF THUMBNAIL |
| FILE NAME |
| AUXILIARY INFORMATION |
| OTHERS |

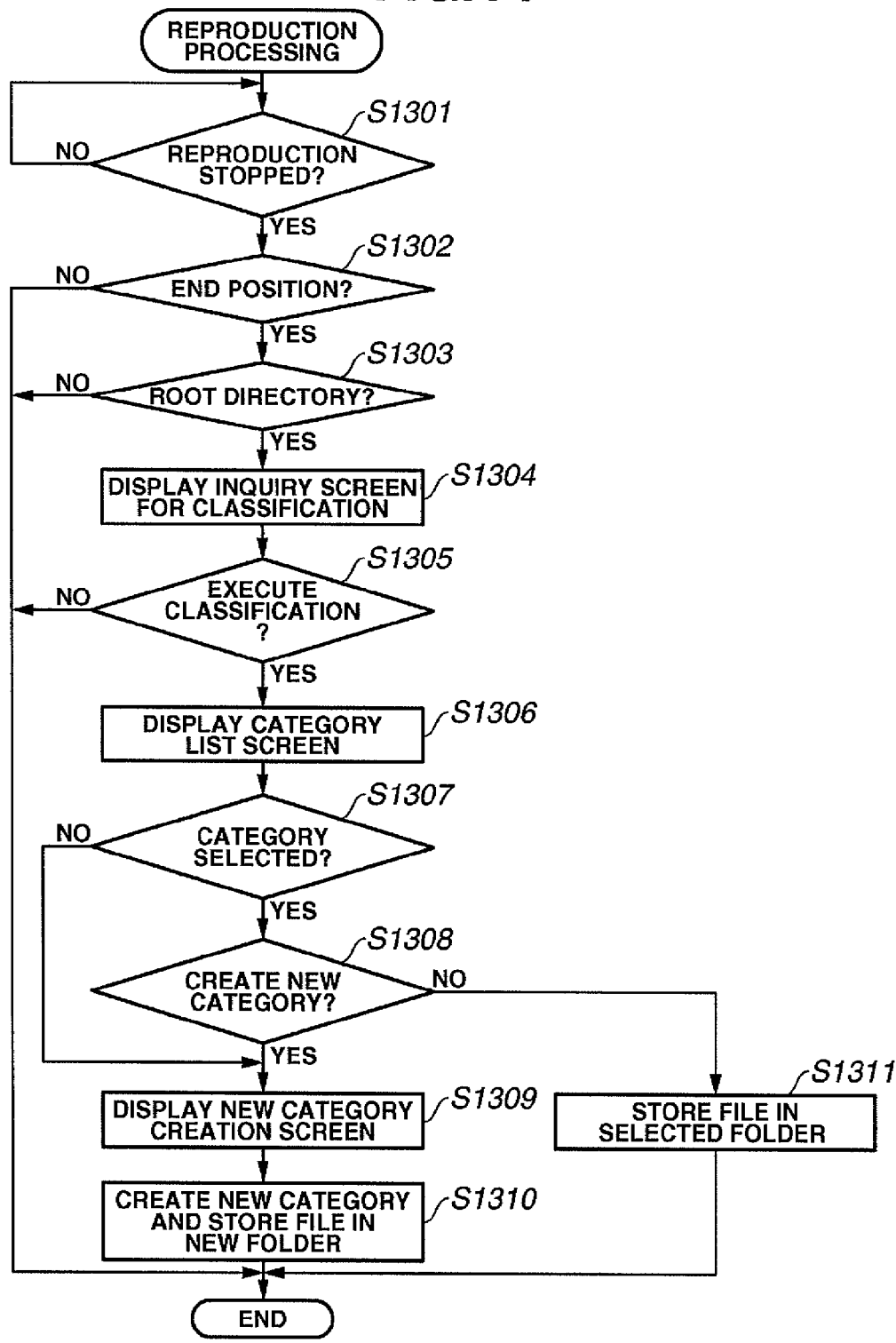

REPRODUCING APPARATUS

CROSS-REFERENCE TO RELATED APPLICATIONS

This application is a continuation of U.S. patent application Ser. No. 11/186,027 filed Jul. 21, 2005, which claims priority from Japanese Patent Application No. 2004-221829 filed Jul. 29, 2004, all of which are hereby incorporated by reference herein in their entirety.

BACKGROUND OF THE INVENTION

1. Field of the Invention

The present invention relates to a reproducing apparatus, and more particularly to a method of classifying content files recorded on a recording medium.

2. Description of the Related Art

Digital cameras configured to record captured image data on a memory card have been known in the prior art. In addition, in recent years, disk video cameras have come onto the market, which record captured moving images and the like on an optical disk such as a DVD (digital versatile disc).

In such digital cameras or video cameras, when digital content, such as moving images, still images, and sound, are recorded on a recording medium, each content is handled as one file and is managed using a file system, such as UDF (Universal Disk Format) or FAT (File Allocation Table).

In a case where a content file recorded and managed in the above-described manner is reproduced, thumbnail images indicating representative images of recorded content files are displayed on a list so as to enable a user to select a desired content to be reproduced.

In addition, the recording capacity of recording media has dramatically increased in recent years, and with the advancement of information compression technologies such as MPEG (Moving Picture Experts Group), a single recording medium allows a great number of content files to be recorded thereon.

Accordingly, it has become necessary to devise a method of easily searching for content desired to be reproduced from many files recorded on a recording medium.

For example, Japanese Laid-Open Patent Application No. 10-254746 discloses a method of searching for desired content from many recorded content. In this method, content data is previously recorded while being classified into groups depending on the recording date, recording location, etc.

However, if content files are automatically classified as in the method disclosed in Japanese Laid-Open Patent Application No. 10-254746, a content file may in some cases be classified in a group not intended by a user.

Therefore, in order to classify and manage content files into groups desired by a user, the user needs to perform special grouping of the content files while checking the contents of each content file. This is very troublesome for the user.

In addition, in a case where content files are handled using a file system as described above, the file system may have a hierarchy structure. In such a file system having a hierarchy structure, it is desirable to more effectively classify content files.

SUMMARY OF THE INVENTION

The present invention is directed to a reproducing apparatus, an image capture apparatus, and a reproduction method.

The reproducing apparatus enables a user to easily classify and manage recorded contents and to comfortably view contents without stress.

In one aspect of the present invention, a reproducing apparatus includes a reproduction unit configured to reproduce content data from a recording medium, a management unit configured to classify a plurality of content data recorded on the recording medium into a plurality of groups, and a control unit configured to, responsive to the reproduction unit stopping reproducing content data, output to a display device inquiry information for classifying the content data into one of the groups.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing indexes contained in the content management file.

FIG. 14 is a flow chart illustrating reproduction processing according to a modification of the embodiment.

DETAILED DESCRIPTION OF THE EMBODIMENTS

Embodiments of the invention will be described in detail below with reference to the drawings.

Figure 1:
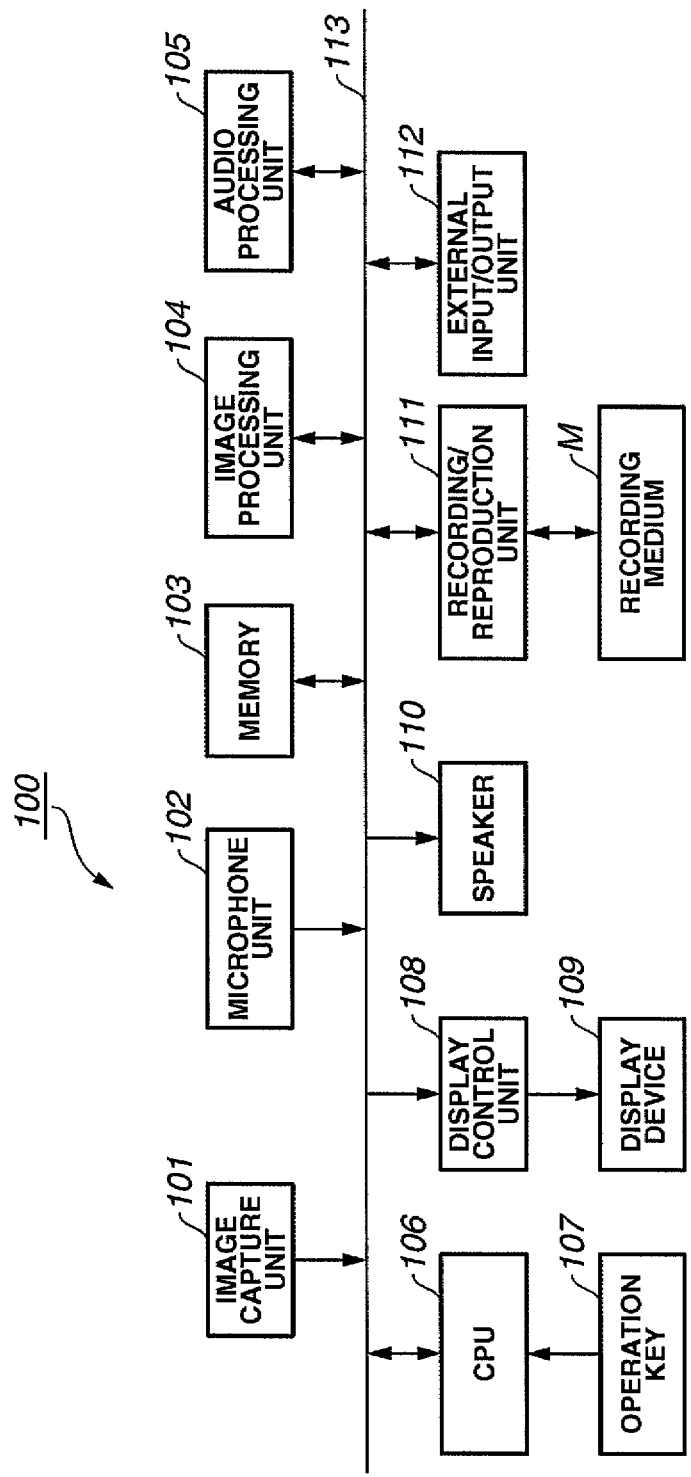
FIG. 1 is a block diagram showing a video camera according to an embodiment of the invention.

FIG. 1 is a block diagram showing a video camera 100 according to an embodiment of the invention.

In FIG. 1, the video camera 100 includes an image capture unit 101, a microphone unit 102, a memory 103, an image processing unit 104, an audio processing unit 105, a CPU (central processing unit) 106, an operation key 107, a display control unit 108, a display device 109, a speaker 110, a recording/reproduction unit 111, an external input/output unit 112, and a data bus 113. The image capture unit 101 includes an optical system such as a lens, a CCD (charge-coupled device) sensor, a camera signal processing circuit, etc. The microphone unit 102 includes a microphone, a microphone amplifier, etc. The image processing unit 104 codes and decodes an image signal. The audio processing unit 105 codes and decodes an audio signal. The CPU 106 controls each unit of the video camera 100. The operation key 107 includes various operation switches operable by a user. The display control unit 108 forms a display screen to be displayed on the display device 109 and outputs the display screen to the display device 109. The display device 109 is, for example, a liquid crystal panel. The speaker 110 outputs reproduced sound. The recording/reproduction unit 111 records and reproduces content data, such as image data and audio data, on or from a recording medium M. The external input/output unit 112 receives and transmits various data from or to the outside of the video camera 100.

In the present embodiment, the recording medium M includes an optical disk, such as a DVD (digital versatile disc), and is removably attached to the video camera 100 by an attachment mechanism (not shown). In addition, the CPU 106 causes the recording/reproduction unit 111 to record on the recording medium M a content file including image and audio data according to a file system, such as UDF or FAT. The file system means a structural system including file data and management information for managing files. Using a common file system enables content files to be handled between different types of recording media or different types of apparatuses.

Recording operation of the video camera 100 is described below.

When a power source (not shown) of the video camera 100 is turned on by a user via the operation key 107, moving image data output from the image capture unit 101 is sent to the display control unit 108. The display control unit 108 forms a moving image captured by the image capture unit 101 on the display device 109. When, in this state, a recording trigger switch of the operation key 107 is turned on by the user to give the CPU 106 an instruction to start a recording operation, the CPU 106 writes moving image data obtained from the image capture unit 101 into the memory 103. The CPU 106 then controls the image processing unit 104 to code moving image data sequentially written in the memory 103 according to the MPEG standard and writes the coded moving image data again into the memory 103. In addition, the CPU 106 writes audio data obtained by the microphone unit 102 into the memory 103. The CPU 106 then controls the audio processing unit 105 to code audio data written in the memory 103 according to the MPEG standard and writes the coded audio data again into the memory 103.

Subsequently, the CPU 106 multiplexes and converts the coded moving image data and audio data written in the memory 103 into a data stream. The CPU 106 then sends the data stream to the recording/reproduction unit 111. In the present embodiment, the data stream is created using the MPEG-2 transport stream format or program stream format.

The recording/reproduction unit 111 records on the recording medium M the data stream including image and audio data sent from the memory 103 according to an instruction from the CPU 106. In this instance, the CPU 106 creates file header information and management information concerning a content file including the image and audio data stream and sends the created information to the recording/reproduction unit 111. The recording/reproduction unit 111 also records the file header information and management information on the recording medium M.

Figure 2:
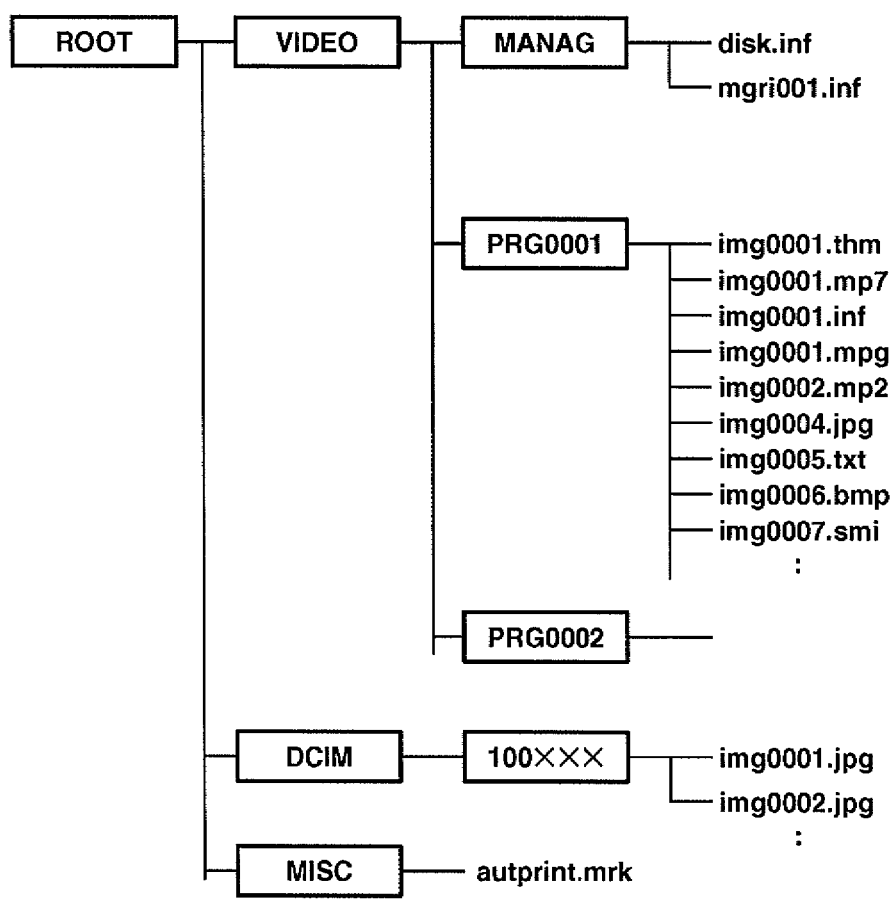
FIG. 2 is a diagram showing an example of a folder structure of recorded content files.

FIG. 2 is a diagram showing an example of a folder structure of content files recorded on the recording medium M. The folder structure is managed by the CPU 106 according to the file system.

Referring to FIG. 2, VIDEO, DCIM and MISC folders are located under a ROOT folder. A MANAG folder for file management is located under the VIDEO folder. The MANAG folder contains a file disk.inf having attributes of the recording medium M written therein, and a file mgri001.inf for managing content files recorded on the recording medium M. Content files recorded on the recording medium M are managed using these management files.

In addition, a PRG0001 folder located under the VIDEO folder contains a group of content files, a file img0001.thm having representative images of the group of content files collectively recorded therein, and a file img0001.mp7 having titles of the group of content files, a search table, auxiliary information, maintenance information, etc., collectively recorded therein. The search table is a hash table having attributes, title, date, ancillary information, etc., of a content file as keys. Examples of content files include an MPEG data file img0001.mpg, an information file img0001.inf having time stamps, structure information, etc., of the MPEG data stream recorded therein, an MPEG audio data file img0002.mp2, a JPEG still-image file img0004.jpg, a text data file img0005.txt, a bit-mapped image file img0006.bmp, a playlist file img0007.smi having the order of reproduction of the group of content files written therein, etc.

If the number of content files or the content file number is greater than a predetermined value, or if a predetermined condition is changed, a new folder, such as PRG002, is created under the VIDEO folder, and content files are located under the new folder. For example, in a case where a content file to be recorded is an MPEG data stream, a file name obtained by incrementing a previously-recorded content file's number by one is used.

More specifically, in a case where a new content file is to be recorded on a recording medium having content files recorded as shown in FIG. 2, the new content file is named img0008.mpg and is recorded in the position of ¥VIDEO¥PRG002¥. In this case, an information file img0008.inf indicating information on a data stream obtained at the time of creation of an MPEG-2 file is also recorded along with the data file img0008.mpg. In addition, a DCIM folder defined by the DCF standard (Design rule for Camera File system) or a MISC folder defined by the DPOF standard (Digital Print Order Format) can be located under the ROOT folder and contain content files created according to these standards.

The content management file mgri001.inf is described in detail below.

The content management file can be used to manage folders and files contained inside the VIDEO folder shown in FIG. 2 or all folders and files contained inside the ROOT folder recorded on the recording medium M. In addition, the content management file can also be used to manage links with content files located outside the recording medium M, for example, content files located on an intranet or the Internet. In the present embodiment, the content management file is used to manage folders and files contained inside the ROOT folder.

Figure 3:
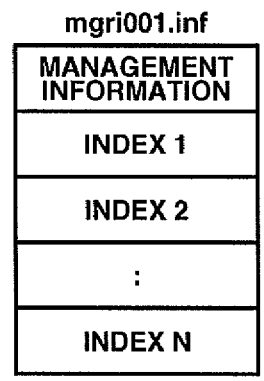
FIG. 3 is a diagram showing the structure of a content management file.

FIG. 3 is a diagram showing the structure of the content management file (index file) mgri001.inf. At the head of the content management file (index file) mgri001.inf, ancillary information is written as management information. The ancillary information includes information on an index type, an effective index identifier, a version of the standard, a compatibility level, a unique number of a recording medium, a file size, the number of indexes in use, the maximum number of indexes, date of creation, updating, access, etc., a creator, text information, etc. In addition, an area in which the structure of a virtual file system (to be described later) is written is secured in the management information.

FIG. 4 is a diagram showing, as an example, indexes contained in the content management file. These indexes describe an attribute, an index number, an extended index of auxiliary information, an index of a thumbnail, a file name, auxiliary information of the content, and other items. As examples of attributes, MPEG-1 is represented by 0x01, MPEG-2 by 0x02, MPEG-4 by 0x03, . . . , a playlist by 0x80, and an effect by 0x90. 0xC0 through 0xFE are reserved. In addition, 0xFF is defined as an extended attribute inherent in a manufacturer. In a case where the same file name is employed in different folders, the file name needs to be described with the full path. This complicates file management. Therefore, the file name is made to contain the value of an attribute so as to facilitate file management. For example, attributes are represented as follows. VIDEO folder=0x00. DCF folder=0x01. External-apparatus folder=0x80.

Each index may have either a fixed length or a variable length. In the case of a variable length, each index has size information added thereto. In addition, the size of a fixed length or a variable length is N times the sector or cluster size of a file system, so that access to files can be made easy.

Furthermore, content files are registered in the content management file mgri001.inf shown in FIG. 2 in the form of the basic index structure shown in FIG. 4. In addition, the folder structure of a virtual file system (to be described below) is also registered in the content management file mgri001.inf.

Figure 5:
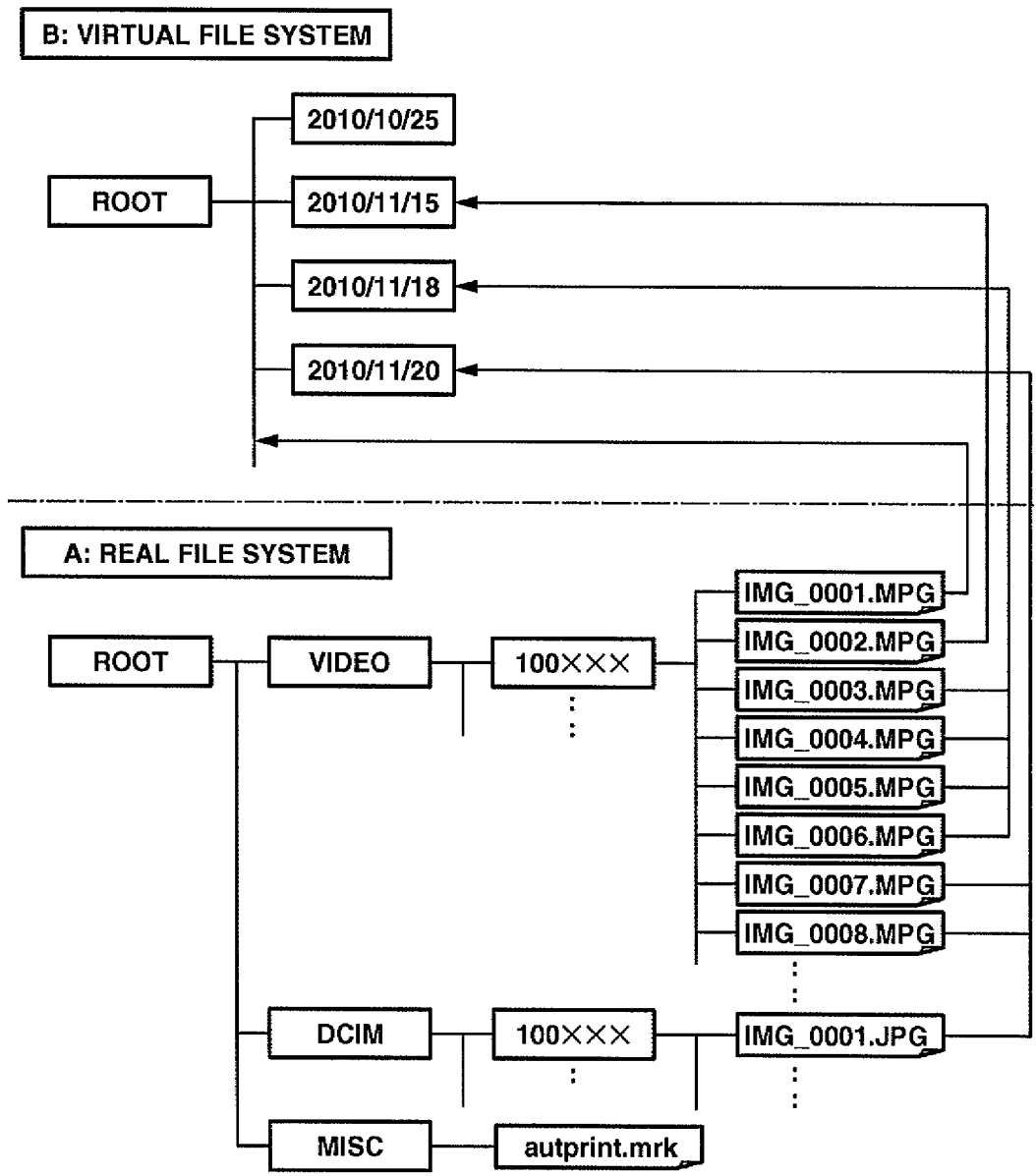
FIG. 5 is a diagram showing the relationship between the folder structure of a real file system and that of a virtual file system.

FIG. 5 is a diagram illustrating a virtual file system.

In the present embodiment, the CPU 106 manages content files recorded on the recording medium M using a real file system A having a folder structure such as that shown in FIG. 5. Furthermore, in addition to file management based on the real file system, the CPU 106 controls grouping or classification of content files, displaying of thumbnails in a list fashion, or selection of contents at the time of reproduction, using a virtual file system B having a folder structure such as that shown in FIG. 5.

Referring to FIG. 5, content files IMG_0002.MPG through IMG_0008.MPG and IMG_0001.JPG stored in a 100xxx folder in the real file system are recorded while being associated with the respective folders in the virtual file system.

More specifically, the file IMG_0002.MPG is recorded on Nov. 15, 2010, and is associated with a 2010/11/15 folder in the virtual file system. Similarly, the files IMG_0003 MPG, IMG_0004.MPG, IMG_0005.MPG, and IMG_0006.MPG are recorded on Nov. 18, 2010, and are associated with a 2010/11/18 folder in the virtual file system. Furthermore, the files IMG_0007.MPG, IMG_0008.MPG, and IMG_0001.JPG are recorded on Nov. 20, 2010, and are associated with a 2010/11/20 folder in the virtual file system.

In addition, the file IMG_0001.MPG is recorded while being associated with a ROOT folder in the virtual file system.

As described above, in the virtual file system, a folder is created that corresponds to the date on which a content file is registered in the real file system, and the content file, which is managed by the real file system, is associated with that folder. Accordingly, an operation for searching file information or the like can be performed using only the index file (content management file) without referring to the real file system. This provides simple and speedy processing. Furthermore, as for an external apparatus that is incapable of interpreting the index file or the virtual file system, the real content file can be accessed using a general-purpose file system. Thus, compatibility can be maintained.

In addition, folders (groups) can be created according to not only dates but also various categories or classes, such as location information, photographing information, apparatus information, and user information.

Furthermore, in the present embodiment, during a recording operation, a recorded content file can be registered and classified into an optionally created folder or can be automatically classified into an existing folder. In addition, after a recording operation, a recorded content file registered in a folder can be migrated into another folder using an editing function. In addition, a new folder can be created, and folders can be subject to deletion and name change.

Reproduction operation of the video camera 100 is described below.

Figure 6:
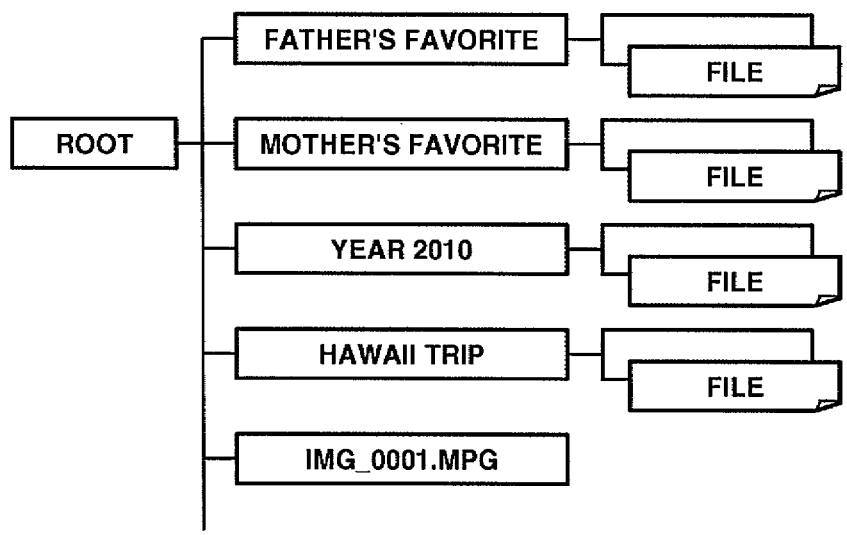
FIG. 6 is a diagram showing an example of the folder structure of the virtual file system.

FIG. 6 is a diagram illustrating a condition where content files recorded on the recording medium M are registered in the virtual file system.

In FIG. 6, "FATHER'S FAVORITE", "MOTHER'S FAVORITE", "YEAR 2010", and "HAWAII TRIP" folders are located under the root directory (ROOT). These folders contain respective content files as lower layers. A file IMG_0001.MPG is registered immediately under the root directory.

Initially, the user operates the operation key 107 to set the video camera 100 to a reproduction mode. The CPU 106 controls the recording/reproduction unit 111 to read out the content management file mgri001.inf from the recording medium M. The CPU 106 then analyzes a virtual directory based on the content management file mgri001.inf to acquire directory information on recorded content files. Based on the directory information, the CPU 106 controls the display control unit 108 to display a list of recorded contents on the display device 109.

Figure 7:
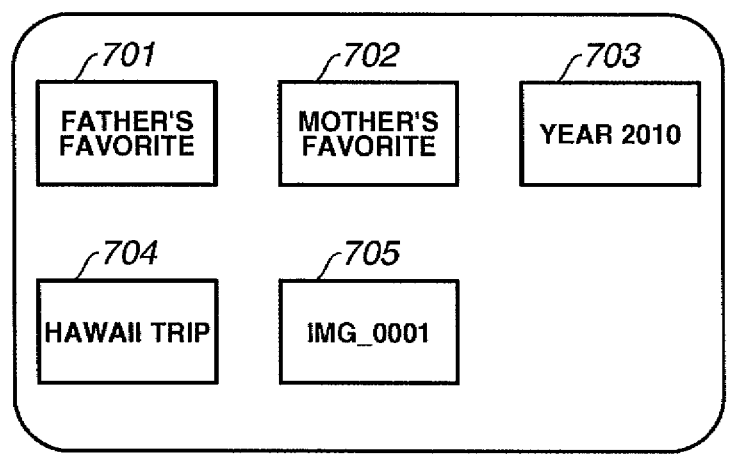
FIG. 7 is a diagram showing a content list screen containing folders and a file in the virtual file system.

FIG. 7 is a diagram showing a content list screen that is displayed on the display device 109.

In FIG. 7, boxes 701 to 704 indicate representative images (thumbnails) or title names of the respective folders, and a box 705 indicates a thumbnail of the content file IMG_0001.MPG.

Under this condition, the user operates the operation key 107 to select a desired folder or file to be reproduced. If the user has selected a folder, a list of content files located under the selected folder is displayed on the display device 109. One or more folders may be contained in the list. Here, it is presumed that the user has selected the content file IMG_0001.MPG.

When the content file IMG_0001.MPG has been selected and determined, the CPU 106 controls the recording/reproduction unit 111 to read out real data of the content file IMG_0001.MPG from the recording medium M. The CPU 106 then controls the image processing unit 104 and the audio processing unit 105 to decode reproduced image and audio data. Then, the CPU 106 causes the display control unit 108 to display on the display device 109 an image represented by the image data and causes the speaker 110 to output sound represented by the audio data.

When the reproduction operation for reproducing the content file IMG_0001.MPG stops at the end of data thereof, the CPU 106 performs processing as described below.

Figure 8:
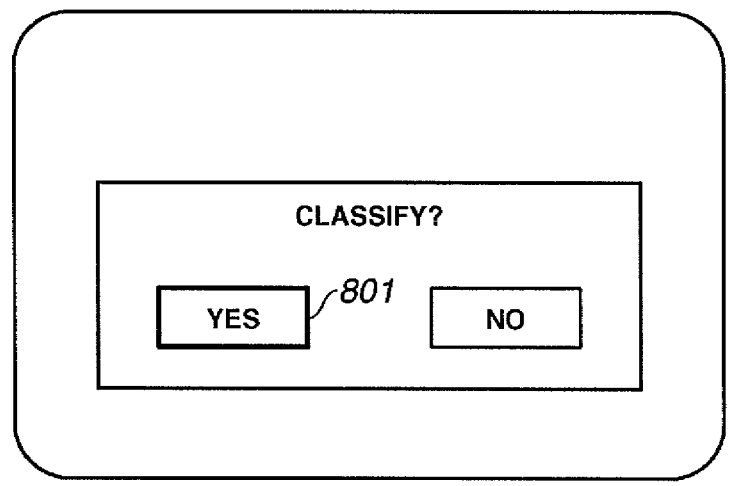
FIG. 8 is a diagram showing an inquiry screen for classifying a reproduced content file.

When receiving an instruction to stop the reproduction operation from the user via the operation key 107, the CPU 106 controls the display control unit 108 to display on the display device 109 an inquiry screen for classifying the reproduced content file, as shown in FIG. 8.

Figure 9:
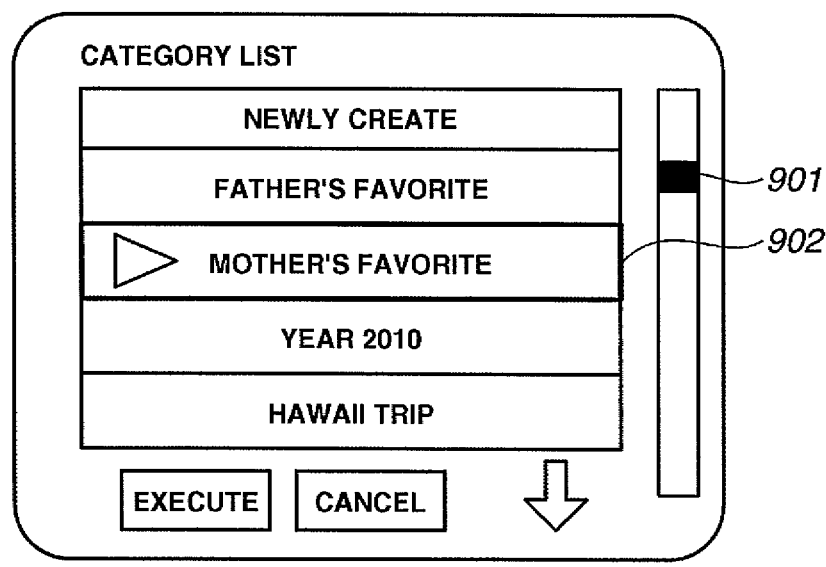
FIG. 9 is a diagram showing a category list screen for selecting a category.

If the user moves a cursor 801 via the operation key 107 to select "YES" in the inquiry screen shown in FIG. 8, the CPU 106 controls the display control unit 108 to display on the display device 109 a category list screen containing classification items, as shown in FIG. 9. In the category list screen, a slider bar 901 indicates the location of a classification item as selected. The user moves a cursor 902 via the operation key 107 to select a classification item. FIG. 9 indicates that the "MOTHER'S FAVORITE" folder is selected. Here, if the user presses the EXECUTE button via the operation key 107, a previously reproduced content file, i.e., the file IMG_0001.MPG, is migrated from the root directory to the "MOTHER'S FAVORITE" folder. The file IMG_0001.MPG is then registered in the "MOTHER'S FAVORITE" folder.

Figure 10:
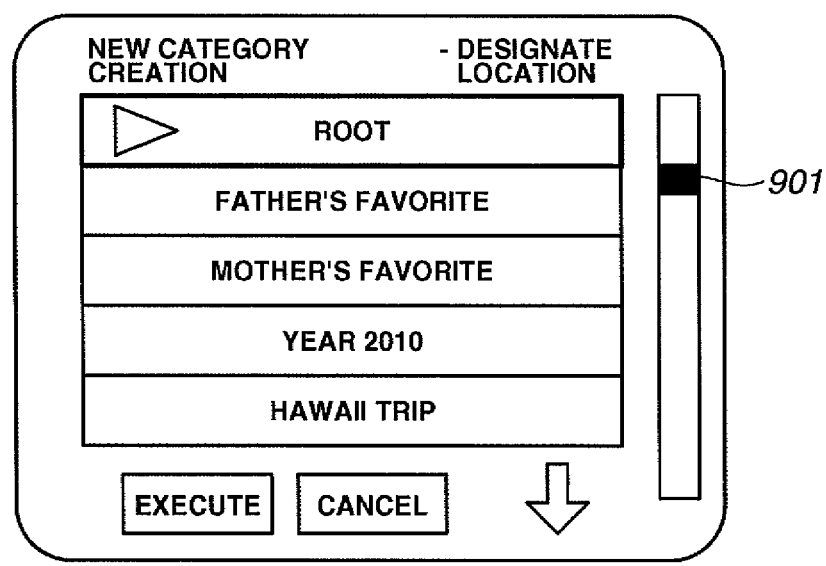
FIG. 10 is a diagram showing a new category creation screen for creating a new category.

If the user selects the item "NEWLY CREATE" and presses the EXECUTE button in order to create a new folder as a classification item, the CPU 106 controls the display control unit 108 to display on the display device 109 a new folder creation screen as shown in FIG. 10. The new folder creation screen is used by the user to designate the location of a new folder. FIG. 10 indicates that the root directory is selected.

Figure 11:
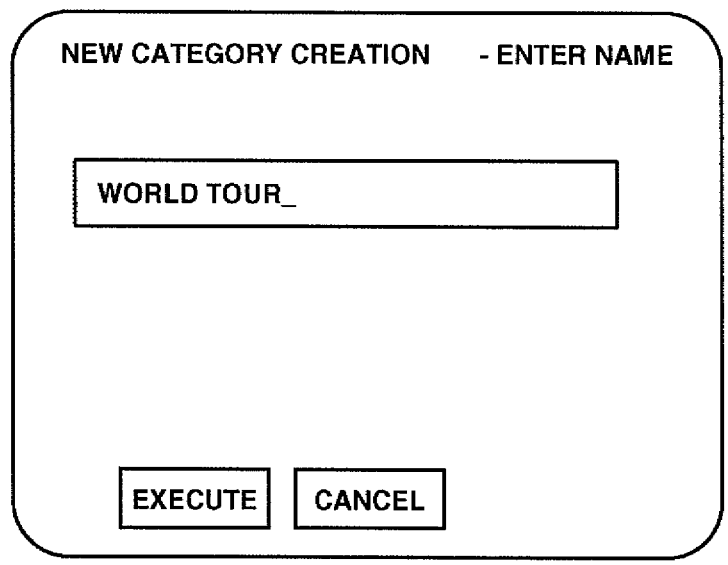
FIG. 11 is a diagram showing a folder title setting screen subsequent to the new category creation screen.
Figure 12:
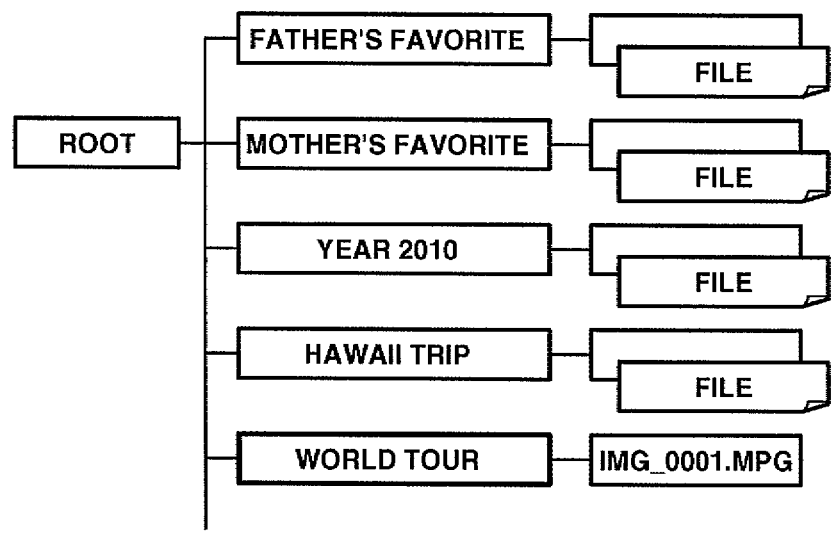
FIG. 12 is a diagram showing the folder structure of a virtual file system obtained after a new category is created.

If, in this condition, the user presses the EXECUTE button via the operation key 107, the CPU 106 controls the display control unit 108 to display on the display device 109 a folder title setting screen as shown in FIG. 11. FIG. 11 indicates that title "WORLD TOUR" has been entered. If, in this condition, the user presses the EXECUTE button via the operation key 107, a new folder named "WORLD TOUR" is created at the location of the root directory. Then, a previously reproduced content file is migrated and stored into the "WORLD TOUR" folder. More specifically, the CPU 106 changes management information of the virtual file system recorded on the recording medium M. This operation changes the folder structure of the virtual file system from the structure shown in FIG. 6 to the structure shown in FIG. 12.

Figure 13:
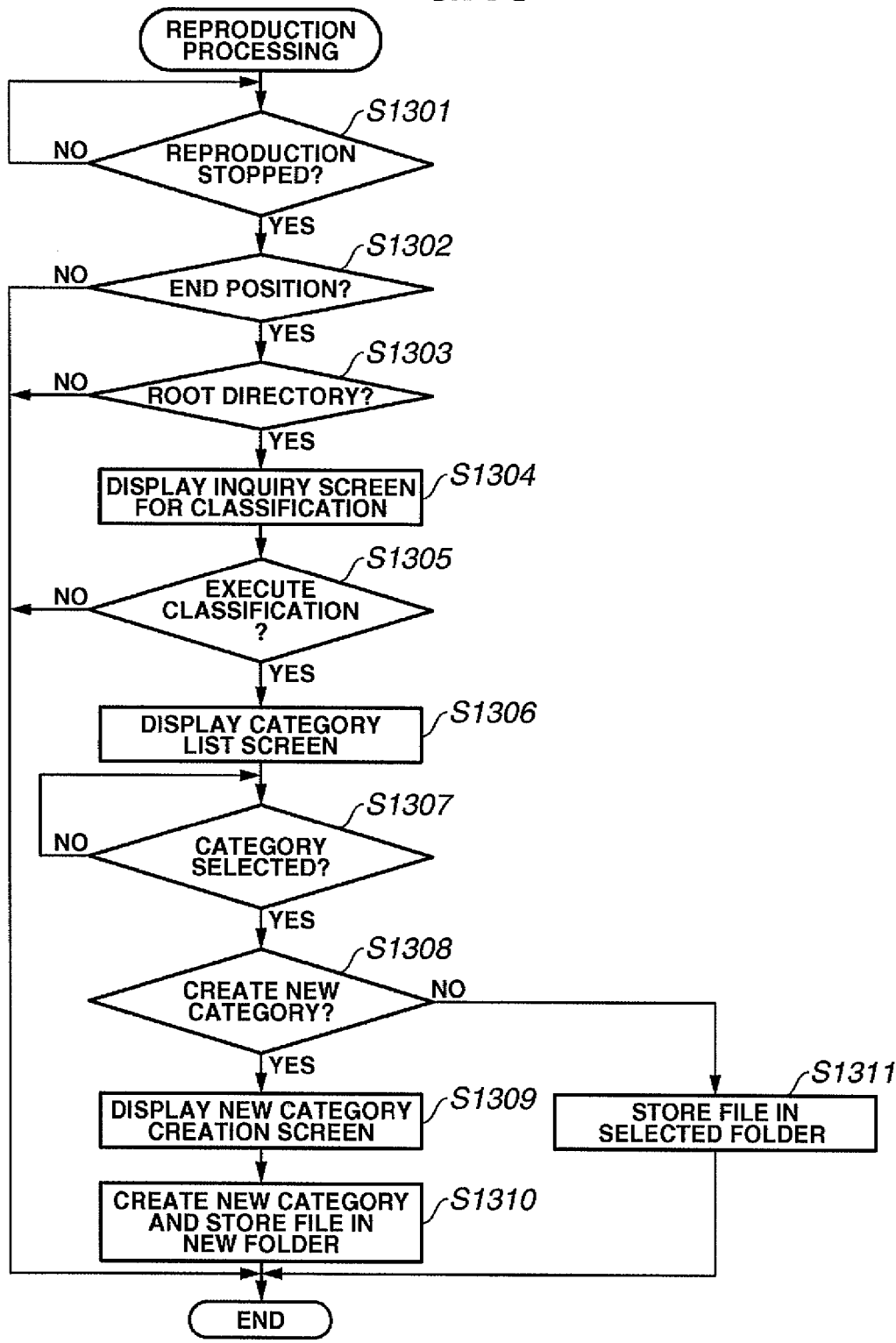
FIG. 13 is a flow chart illustrating reproduction processing according to the embodiment.

FIG. 13 is a flow chart illustrating the above-described reproduction processing.

After reproduction processing is started, the CPU 106 checks to determine if reproduction is stopped (step S1301). If, in step S1301, it is determined that reproduction is not stopped, the CPU 106 waits until reproduction is stopped. If, in step S1301, it is determined that reproduction is stopped, the CPU 106 checks to determine if the stopping position of a content file for which reproduction is stopped is the end of data thereof (step S1302). If, in step S1302, it is determined that the stopping position is not the end of data, the CPU 106 immediately ends processing. If, in step S1302, it is determined that the stopping position is the end of data, the CPU 106 checks to determine if the reproduced content file is located in the root directory of the virtual file system (step S1303). If, in step S1303, it is determined that the reproduced content file is not located in the root directory, the CPU 106 immediately ends processing.

If, in step S1303, it is determined that the reproduced content file is located in the root directory, the CPU 106 causes an inquiry screen for classifying the reproduction-stopped content file to be displayed (step S1304). The CPU 106 then checks to determine if classification is to be executed (step S1305). If, in step S1305, it is determined that classification is cancelled, the CPU 106 immediately ends processing. If, in step S1305, it is determined that classification is to be executed, the CPU 106 causes a category list screen for classification to be displayed (step S1306). The CPU 106 then waits for a category to be selected (step S1307). If, in step S1307, it is determined that a category is selected, the CPU 106 checks to determine if a new category is required to be created (step S1308). If, in step S1308, it is determined that a new category is required to be created, the CPU 106 causes a new category creation screen to be displayed (step S1309). The CPU 106 then creates a new category and stores the reproduction-stopped content file into a folder of the created category (step S1310). Then, the CPU 106 ends processing.

On the other hand, if, in step S1308, it is determined that the selected category is one of the already created categories, the CPU 106 stores the reproduction-stopped content file into a folder of the selected category (step S1311). Then, the CPU 106 ends processing.

As described above, in the present embodiment, inquiry information for classifying content data into a category is output to a display device in response to stopping of reproduction of the content data. Accordingly, the user is allowed to classify content data without stress and to easily manage recorded contents.

Furthermore, a list of already created categories is displayed. Accordingly, the user is allowed to select a desired category from the list, thus saving the trouble of classification.

Moreover, a screen for creating a new category can be displayed subsequent to the category list screen. Accordingly, a new category can be easily created.

In addition, the above-described processing is applied to reproduction of a content file located in the root directory or reproduction of a content file inapplicable to any classification item. Accordingly, unnecessary classification of content files can be avoided.

It should be noted that, in the above-described embodiment, "category" means a classification item, a group, or the like associated with the attribute of file contents. In addition, the hierarchical location of a category in the virtual file system can be optionally created.

Furthermore, not only a method in which the user optionally selects a desired category but also a method in which the CPU automatically determines the relationship between a category attribute and a file attribute can be applied to the above-described processing.

While, in the above-described embodiment, an inquiry screen for classification is displayed only at the time of stopping of reproduction of a content file located under the root directory in the virtual file system, the inquiry screen for classification may also be displayed at the time of stopping of reproduction of a content file stored in another folder.

Furthermore, while, in the above-described embodiment, an inquiry screen for classification is displayed at the time of stopping of reproduction after reproduction reaches the end of content data, the inquiry screen for classification can be configured to be displayed even when reproduction is stopped in the middle of content data without reaching the end thereof. In this case, the user is allowed to optionally change over between a mode for displaying the inquiry screen for classification when reproduction reaches the end of content data and a mode for displaying the inquiry screen for classification even when reproduction is stopped in the middle of content data.

Furthermore, in a case where the percentage of the time length of a reproduced data portion in the total time length of content data is a predetermined value or more, for example, in a case where one-half or more of content data has been reproduced, the inquiry screen for classification may be configured to be automatically displayed even when reproduction is stopped in the middle of content data.

In addition, in a case where classification is cancelled when the inquiry screen for classification is displayed, the new category creation screen may be displayed without immediately ending processing. Alternatively, the CPU 106 can control the display control unit 108 to display on the display device 109 a "CLASSIFY" button (not shown) together with the displayed image. The user can select the CLASSIFY button at any time by moving a cursor via the operation key 107 to select the "CLASSIFY" button and then the category list screen of FIG. 9 is displayed on the display screen.

Furthermore, in a case where a category is not selected when the category list screen for classification is displayed, the new category creation screen may be immediately displayed. This process is shown in the flow chart of FIG. 14.

FIG. 14 differs from the flow chart of FIG. 13 in that if, in step S1307, it is determined that a category is not selected, the CPU 106 proceeds to step S1309 where the new category creation screen is automatically displayed. The other steps are the same as those of FIG. 13.

In addition, in a case where a category is not selected when the category list screen for classification is displayed, a reproduced content file may be automatically migrated and registered into a folder named, for example, "NONCLASSIFICATION" for collecting content files not belonging to the existing categories, without displaying the new category creation screen shown in FIG. 10. In that case, a flag indicating that effect is appended and recorded to the content file, and that effect is displayed at the time of the next reproduction. In addition, the content file may be deleted or may be configured to be a hidden file.

Furthermore, while, in the above-described embodiment, an optical disk is used to record and reproduce image and audio data, any recording medium handling data in the form of files, such as a memory card using a semiconductor memory, can also be used.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A reproducing apparatus comprising:
a reproduction unit configured to reproduce content data from a recording medium;
a classification unit configured to classify a plurality of content data recorded on the recording medium into a plurality of groups;
a receiving unit configured to receive a reproduction stop instruction to stop reproducing the content data, the reproducing unit stopping reproducing the content data in response to the reproduction stop instruction;
a discrimination unit configured to discriminate whether the content data stopped from being reproduced by the reproduction stop instruction has already been classified into one of the groups;
an inquiry unit configured to inquire of a user whether to execute, by the classification unit, a classification operation for classifying the content data stopped from being reproduced by the reproduction stop instruction into one of the groups; and
a control unit configured to control, in accordance with a discrimination result by the discrimination unit, whether the inquiry unit performs the inquiry,
wherein the control unit controls the classification unit to execute the classification operation in accordance with an instruction to execute the classification operation as a result of the inquiry.

2. The reproducing apparatus according to claim 1, further comprising a selection unit facilitating selecting at least one of the plurality of groups in accordance with the instruction to execute the classification operation,
wherein the classification unit classifies the content data stopped from being reproduced by the reproduction unit into the group selected by the selection unit.

3. A reproducing apparatus comprising:
a reproduction unit configured to reproduce moving image data from a recording medium;
a classification unit configured to classify a plurality of moving image data recorded on the recording medium into a plurality of groups;
a detection unit configured to detect a reproduction stop position in the moving image data;
an inquiry unit configured to inquire of a user whether to execute, by the classification unit, a classification operation for classifying the moving image data into one of the groups; and
a control unit configured to control, based on the reproduction stop position detected by the detection unit, whether the inquiry unit performs the inquiry,
wherein the control unit controls the classification unit to execute the classification operation in accordance with an instruction to execute the classification operation as a result of the inquiry.

4. The reproducing apparatus according to claim 3, wherein the control unit controls the inquiry unit to perform the inquiry when the reproduction stop position detected by the detection unit is an end position of the moving image data, and stops the inquiry by the inquiry unit when the reproduction stop position detected by the detection unit is a position other than the end position of the moving image data.

5. The reproducing apparatus according to claim 3, further comprising a selection unit facilitating selecting at least one of the plurality of groups in accordance with the instruction to execute the classification operation,
wherein the classification unit classifies the moving image data into the group selected by the selection unit.

6. A reproducing apparatus comprising:
a reproduction unit configured to reproduce content data from a recording medium, the content data recorded on the recording medium being stored in a directory;
a classification unit configured to classify a plurality of content data recorded on the recording medium into a plurality of groups;
a discrimination unit configured to discriminate whether the content data is stored in a predetermined directory;
an inquiry unit configured to inquire of a user whether to execute, by the classification unit, a classification operation for classifying the content data into one of the groups; and
a control unit configured to control, in accordance with a discrimination result by the discrimination unit, whether the inquiry unit performs the inquiry,
wherein the control unit controls the classification unit to execute the classification operation in accordance with an instruction to execute the classification operation as a result of the inquiry.

7. A reproducing method comprising the steps of:
reproducing content data from a recording medium, the step of reproducing stopping reproducing the content data in response to the reproduction stop instruction;

classifying a plurality of content data recorded on the recording medium into a plurality of groups;

receiving a reproduction stop instruction to stop reproducing the content data;

discriminating whether the content data stopped from being reproduced by the reproduction stop instruction has already been classified into one of the groups;

inquiring of a user whether to execute, in the classifying step, a classification operation for classifying the content data stopped from being reproduced by the reproduction stop instruction into one of the groups; and controlling, in accordance with a discrimination result by the discriminating step, whether the inquiry by the step of inquiring is performed, wherein the controlling step includes controlling the classifying step to execute the classification operation in accordance with an instruction to execute the classification operation as a result of the inquiry.

8. A reproducing method comprising the steps of:

reproducing moving image data from a recording medium;

classifying a plurality of moving image data recorded on the recording medium into a plurality of groups;

detecting a reproduction stop position in the moving image data;

inquiring of a user whether to execute, in the classifying step, a classification operation for classifying the moving image data stopped from being reproduced by the reproduction stop instruction into one of the groups; and controlling, based on the reproduction stop position detected by the detecting step, whether the inquiry by the inquiring step is performed, wherein the controlling step includes controlling the classification step to execute the classification operation in accordance with an instruction to execute the classification operation as a result of the inquiry.

9. A reproducing method comprising the steps of:

reproducing content data from a recording medium, the content data recorded on the recording medium being stored in a directory;

classifying a plurality of content data recorded on the recording medium into a plurality of groups;

discriminating whether the content data is stored in a predetermined directory;

inquiring of a user whether to execute, in the classifying step, a classification operation for classifying the content data into one of the groups; and controlling, in accordance with a discrimination result by the discriminating step, whether the inquiry by the step of inquiring is performed, wherein the controlling step includes controlling the classifying step to execute the classification operation in accordance with an instruction to execute the classification operation as a result of the inquiry.

10. The reproducing apparatus according to claim 1, wherein the control unit stops the inquiry by the inquiry unit when the content data stopped from being reproduced by the reproduction stop instruction has been classified into one of the groups, and controls the inquiry unit to perform the inquiry when the content data stopped from being reproduced by the reproduction stop instruction has not been classified into any one of the groups.

11. The reproducing apparatus according to claim 1, wherein the inquiry unit displays on a display device an inquiring screen for inquiring of a user whether the classification unit executes the classification operation.

12. The reproducing apparatus according to claim 3, wherein the inquiry unit displays on a display device an inquiring screen for inquiring of a user whether the classification unit executes the classification operation.

* * * * *